US006246680B1

(12) United States Patent
Muller et al.

(10) Patent No.: US 6,246,680 B1
(45) Date of Patent: Jun. 12, 2001

(54) HIGHLY INTEGRATED MULTI-LAYER SWITCH ELEMENT ARCHITECTURE

(75) Inventors: Shimon Muller, Sunnyvale; Ariel Hendel, Cupertino; Howard Frazier, Pleasanton, all of CA (US)

(73) Assignee: Sun Microsystems, Inc., Mountain View, CA (US)

( * ) Notice: Subject to any disclaimer, the term of this patent is extended or adjusted under 35 U.S.C. 154(b) by 17 days.

(21) Appl. No.: 08/884,704

(22) Filed: Jun. 30, 1997

(51) Int. Cl.$^7$ ..................................................... H04L 12/56

(52) U.S. Cl. ........................... 370/389; 370/395; 370/412

(58) Field of Search ................................... 370/389, 428, 370/355, 356, 357, 359, 360, 362, 367, 372, 375, 379, 380, 328, 400, 401, 402, 465, 468, 418, 434, 395, 386, 396, 398, 408, 412, 419, 429

(56) References Cited

U.S. PATENT DOCUMENTS

| | | | |
|---|---|---|---|
| 4,539,637 | 9/1985 | DeBruler | 364/200 |
| 4,627,052 | 12/1986 | Hoare et al. | 370/88 |
| 4,641,302 | 2/1987 | Miller | 370/60 |
| 4,652,874 | 3/1987 | Loyer | 340/825.05 |
| 4,737,953 | 4/1988 | Koch et al. | 370/94 |
| 4,807,111 | 2/1989 | Cohen et al. | 364/200 |
| 4,811,337 | 3/1989 | Hart | 370/85 |
| 4,850,042 | 7/1989 | Petronio et al. | 455/606 |
| 4,899,333 | 2/1990 | Roediger | 370/427 |
| 4,922,503 | 5/1990 | Leone | 370/85.13 |
| 4,933,938 | 6/1990 | Sheehy | 370/401 |
| 4,935,869 | 6/1990 | Yamamoto | 364/200 |
| 5,130,977 | 7/1992 | May et al. | 370/60 |
| 5,150,358 | * 9/1992 | Punj et al. | 370/468 |
| 5,159,685 | 10/1992 | Kung | 395/575 |

(List continued on next page.)

FOREIGN PATENT DOCUMENTS 0725351   7/1996   (EP) ............................. G06F/13/36

OTHER PUBLICATIONS

"Foundry Products", downloaded from Website http://www.foundrynet.com/ on Jun. 19, 1997.
Anthony J. McAuley & Paul Francis, "Fast Routing Table Lookup Using CAMs", IEEE, 1993, pp. 1382–1390.
"Gigabit Ethernet", Network Strategy Report, The Burton Group, v2, May 8, 1997 40 pages.
"IP On Speed", Erica Roberts, Internet–Draft, Data Communications on the Web, Mar. 1997, 12 pages.

*Primary Examiner*—Dang Ton
*Assistant Examiner*—Phirin Sam
(74) *Attorney, Agent, or Firm*—Blakely, Sokoloff, Taylor & Zafman

(57) ABSTRACT

An architecture for a highly integrated network element building block is provided. According to one aspect of the present invention, a network device building block includes a network interface with multiple ports for transmitting and receiving packets over a network. The network device building block also includes a packet buffer storage which is coupled to the network interface. The packet buffer storage acts as an elasticity buffer for adapting between incoming and outgoing bandwidth requirements. A shared memory manager may also be provided dynamically allocate and deallocate buffers in the packet buffer storage on behalf of the network interface and other clients of the packet buffer storage. The network device building block further includes a switch fabric which is coupled to the network interface. The switch fabric provides forwarding decisions for received packets. A given forwarding decision includes a list of ports upon which a particular received packet is to be forwarded. A central processing unit (CPU) interface is also included in the network device building block. The CPU interface is coupled to the switch fabric and is configured to forward packets received from the CPU based upon forwarding decisions provided by the switch fabric.

12 Claims, 3 Drawing Sheets

U.S. PATENT DOCUMENTS

| | | | |
|---|---|---|---|
| 5,163,046 | 11/1992 | Hahne et al. | 370/79 |
| 5,210,746 | 5/1993 | Maher et al. | 370/79 |
| 5,220,562 | 6/1993 | Takada et al. | 370/401 |
| 5,231,633 | 7/1993 | Hluchyj et al. | 370/94.1 |
| 5,251,205 | 10/1993 | Callon et al. | 370/60 |
| 5,278,830 | 1/1994 | Kudo | 370/94.1 |
| 5,291,482 | 3/1994 | McHarg et al. | 370/413 |
| 5,293,379 | 3/1994 | Carr | 370/474 |
| 5,301,333 | 4/1994 | Lee | 395/725 |
| 5,305,311 | 4/1994 | Lyles | 370/60 |
| 5,309,437 | 5/1994 | Perlman et al. | 340/827 |
| 5,313,454 | 5/1994 | Bustini et al. | 370/13 |
| 5,343,471 | 8/1994 | Cassanol | 370/401 |
| 5,353,412 | 10/1994 | Douglas et al. | 395/325 |
| 5,365,514 | 11/1994 | Hershey et al. | 370/17 |
| 5,386,413 | 1/1995 | McAuley et al. | 370/54 |
| 5,392,432 | 2/1995 | Engelstad et al. | 395/700 |
| 5,394,402 | 2/1995 | Ross | 370/402 |
| 5,396,602 | 3/1995 | Amini et al. | 395/325 |
| 5,402,415 | 3/1995 | Turner | 370/60 |
| 5,404,538 | 4/1995 | Krappweis, Sr. | 395/725 |
| 5,410,540 | 4/1995 | Aiki et al. | 370/390 |
| 5,410,722 | 4/1995 | Cornaby | 395/800 |
| 5,420,862 | 5/1995 | Perlman | 370/85.13 |
| 5,422,838 | 6/1995 | Lin | 365/49 |
| 5,425,026 | 6/1995 | Mori | 370/60 |
| 5,425,028 | 6/1995 | Britton et al. | 370/94.1 |
| 5,426,736 | 6/1995 | Guineau, III | 395/250 |
| 5,432,907 | 7/1995 | Picazo, Jr. et al. | 395/200 |
| 5,450,399 | 9/1995 | Sugita | 370/60.1 |
| 5,455,820 | 10/1995 | Yamada | 370/413 |
| 5,457,681 | 10/1995 | Gaddis et al. | 370/402 |
| 5,459,714 | 10/1995 | Lo et al. | 370/13.1 |
| 5,459,717 | 10/1995 | Mullan et al. | 370/351 |
| 5,461,611 | 10/1995 | Drake et al. | 370/54 |
| 5,461,624 | 10/1995 | Mazzola | 370/402 |
| 5,473,607 | 12/1995 | Hausman | 370/85.13 |
| 5,477,537 | 12/1995 | Dankert et al. | 370/60 |
| 5,481,540 | 1/1996 | Huang | 370/85.13 |
| 5,485,455 | 1/1996 | Dobbins et al. | 370/255 |
| 5,485,578 * | 1/1996 | Sweazey | 395/200.54 |
| 5,490,139 | 2/1996 | Baker et al. | 370/60 |
| 5,490,252 | 2/1996 | Macera et al. | 395/200.79 |
| 5,490,260 | 2/1996 | Miller et al. | 395/427 |
| 5,493,564 | 2/1996 | Mullan | 370/54 |
| 5,500,860 | 3/1996 | Perlman et al. | 370/85.13 |
| 5,509,123 | 4/1996 | Dobbins et al. | 395/200.15 |
| 5,515,376 | 5/1996 | Murthy et al. | 340/402 |
| 5,517,488 | 5/1996 | Miyazaki et al. | 370/16 |
| 5,524,212 * | 6/1996 | Somani et al. | 711/121 |
| 5,535,202 | 7/1996 | Kondoh | 370/60.1 |
| 5,550,816 | 8/1996 | Hardwick et al. | 370/60 |
| 5,553,070 | 9/1996 | Walker et al. | 370/60 |
| 5,555,405 | 9/1996 | Griesmaer et al. | 395/600 |
| 5,557,610 | 9/1996 | Calamvokis et al. | 370/60.1 |
| 5,561,666 * | 10/1996 | Christensen et al. | 370/434 |
| 5,561,791 | 10/1996 | Mendelson et al. | 395/550 |
| 5,563,878 | 10/1996 | Blakeley et al. | 370/60 |
| 5,566,067 | 10/1996 | Bakke et al. | 370/60 |
| 5,570,365 | 10/1996 | Yodhida | 370/85.6 |
| 5,572,522 | 11/1996 | Calamvokis et al. | 370/395 |
| 5,583,981 | 12/1996 | Pleyer | 395/326 |
| 5,592,476 | 1/1997 | Calamvokis et al. | 370/390 |
| 5,594,727 * | 1/1997 | Kolbenson et al. | 370/468 |
| 5,600,641 | 2/1997 | Duault et al. | 370/400 |
| 5,602,841 | 2/1997 | Lebizay et al. | 370/413 |
| 5,606,669 | 2/1997 | Bertin et al. | 395/200.15 |
| 5,608,726 | 3/1997 | Virgile | 370/401 |
| 5,610,905 | 3/1997 | Murthy et al. | 370/401 |
| 5,615,340 * | 3/1997 | Dai et al. | 370/419 |
| 5,617,421 | 4/1997 | Chin et al. | 370/402 |
| 5,617,537 * | 4/1997 | Yamada et al. | 709/214 |
| 5,619,497 * | 4/1997 | Gallagher et al. | 370/394 |
| 5,619,500 | 4/1997 | Hiekali | 370/414 |
| 5,619,661 | 4/1997 | Crews et al. | 395/299 |
| 5,623,489 | 4/1997 | Cotton et al. | 370/381 |
| 5,633,710 | 5/1997 | Mandal et al. | 364/514 |
| 5,633,865 | 5/1997 | Short | 370/412 |
| 5,636,371 | 6/1997 | Yu | 395/200.57 |
| 5,640,605 | 6/1997 | Johnson et al. | 395/881 |
| 5,649,109 | 7/1997 | Griesmer et al. | 395/200.17 |
| 5,651,002 | 7/1997 | Van Seters et al. | 370/401 |
| 5,675,741 | 10/1997 | Aggarwal et al. | 370/200.12 |
| 5,684,800 | 11/1997 | Dobbins et al. | 370/401 |
| 5,689,506 * | 11/1997 | Chiussi et al. | 370/388 |
| 5,689,518 | 11/1997 | Galand et al. | 371/37.1 |
| 5,691,984 | 11/1997 | Gardner et al. | 370/401 |
| 5,706,472 | 1/1998 | Ruff et al. | 395/497.04 |
| 5,720,032 | 2/1998 | Picazo, Jr. et al. | 395/200.8 |
| 5,724,348 * | 3/1998 | Basso et al. | 370/422 |
| 5,724,358 * | 3/1998 | Headrick et al. | 370/418 |
| 5,726,977 | 3/1998 | Lee | 370/235 |
| 5,734,651 | 3/1998 | Blakeley et al. | 370/392 |
| 5,734,865 | 3/1998 | Yu | 395/500 |
| 5,740,171 | 4/1998 | Mazzola et al. | 370/392 |
| 5,740,175 | 4/1998 | Wakeman et al. | 395/200.45 |
| 5,740,375 | 4/1998 | Dunne et al. | 395/200.68 |
| 5,742,604 | 4/1998 | Edsall et al. | 370/401 |
| 5,742,760 | 4/1998 | Picazo, Jr. et al. | 370/351 |
| 5,745,048 | 4/1998 | Taguchi et al. | 340/870.01 |
| 5,748,631 | 5/1998 | Bergantino et al. | 370/398 |
| 5,748,905 | 5/1998 | Hauser et al. | 395/200.79 |
| 5,751,967 | 5/1998 | Raab et al. | 395/200.72 |
| 5,751,971 | 5/1998 | Dobbins et al. | 395/200.68 |
| 5,754,540 | 5/1998 | Liu et al. | 370/315 |
| 5,754,774 | 5/1998 | Bittinger et al. | 395/200.33 |
| 5,754,801 | 5/1998 | Lambrecht et al. | 395/308 |
| 5,757,771 | 5/1998 | Li et al. | 370/235 |
| 5,757,795 | 5/1998 | Schnell | 370/392 |
| 5,761,435 | 6/1998 | Fukuda et al. | 395/200.68 |
| 5,764,634 * | 6/1998 | Christensen et al. | 370/401 |
| 5,764,636 | 6/1998 | Edsall | 370/401 |
| 5,781,549 | 7/1998 | Dai | 370/398 |
| 5,784,573 | 7/1998 | Szczepanek et al. | 395/200.8 |
| 5,790,546 * | 8/1998 | Dobbins et al. | 370/400 |
| 5,790,808 | 8/1998 | Seaman | 395/200.53 |
| 5,802,047 | 9/1998 | Kinoshita | 370/359 |
| 5,802,052 | 9/1998 | Venkataraman | 370/395 |
| 5,802,278 | 9/1998 | Isfeld et al. | 395/200.02 |
| 5,812,527 * | 9/1998 | Kline et al. | 370/232 |
| 5,815,737 | 7/1998 | Buckland | 395/905 |
| 5,822,319 | 10/1998 | Nagami et al. | 370/392 |
| 5,825,767 | 10/1998 | Mizukoshi et al. | 370/395 |
| 5,831,980 * | 11/1998 | Varma et al. | 370/395 |
| 5,835,491 * | 11/1998 | Davis et al. | 370/386 |
| 5,838,677 | 11/1998 | Kozaki et al. | 370/389 |
| 5,838,681 * | 11/1998 | Bonomi et al. | 370/395 |
| 5,856,977 * | 1/1999 | Yang et al. | 370/412 |
| 5,859,849 * | 1/1999 | Parks | 370/395 |
| 5,867,677 * | 2/1999 | Tsukamoto | 370/395 |
| 5,872,783 | 2/1999 | Chin | 370/395 |
| 5,872,904 * | 2/1999 | McMillen et al. | 370/217 |
| 5,875,464 | 2/1999 | Kirk | 711/129 |
| 5,898,687 * | 4/1999 | Harriman et al. | 370/389 |

OTHER PUBLICATIONS

"Multilayer Topology", White Paper, Internet–Draft, 13 pages, downloaded from Website http://baynetworks.com on Apr. 18, 1997.

International Search Report, PCT/US98/13203, 7 pages.

International Search Report, PCT/US98/13202, 4 pages.
International Search Report, PCT/US98/13368, 5 pages.
International Search Report, PCT/US98/13364, 4 pages.
International Search Report, PCT/US98/13365, 4 pages.
International Search Report, PCT/US98/13177, 4 pages.
International Search Report, PCT/US98/13199, 5 pages.
International Search Report, PCT/US98/13015, 5 pages.
International Search Report, PCT/US98/13016, 4 pages.

Wang et al., "A Novel Message Switch For Highly Parallel Systems", IEEE, pp. 150–155, 1989.

Tobagi, Fast Packet Switch / Architectures For Broadband Integrated Services Digital Networks, Proceedings of the IEEE, vol. 78, Issue 1, pp. 133–167, 1/1990.

Fliesser et al., "Design Of A Multicast ATM Packet Switch, Electrical and Computer Engineering", 1993 Canadian Conferencem pp. 779–783, 1993.

Chang et al., An Overview Of The Pipelined Common Buffer Architecture (PCBA) For Memory Based Packet/Cell Switching Systems, Local Computer Networks, 1994, pp. 288–297, 19$^{th}$ Conference IEEE.

Agarwal et al., "A Scalable Shared Buffer ATM Switch Architecture", VLSI, 1995 5$^{th}$ Great Lakes Symposium, IEEE, pp. 256–261, 1994.

Sabaa et al., "Implementation Of A Window–Based Scheduler In An ATM Switch", Electrical An Computer Engineering, 1995 Canadian Conference, IEEE, pp. 32–35, 1995.

International Search Report, PCT/US98/13361, 5 pages.

International Search Report, PCT/US98/13200, 6 pages.

Naraghi–Pour et al., A Multiple Shared Memory Switch, System Theory, 1996 Southeastern Symposium, IEEE, pp. 50–541996.

Iyengar et al., Switching Prioritized Packets, GLOBECOM '89, Telecommunications Conference, pp. 1181–1186, 1989.

International Search Report, PCT/US98/13206, 8 pages.

International Search Report, PCT/US98/13362, 5 pages.

"Load Balancing for Multiple Interfaces for Transmission Control Protocol/Internet Protocol for AM/MVS", IBM Technical Disclosure Bulletin, 38(9): 7–9 (Sep., 1995).

T. Nishizono et al., "Analysis on a Multilink Packet Transmission System", Electron. Commun. JPN 1, Commun., (USA), 68(9):98–104 (Sep., 1985).

* cited by examiner

HIGHLY INTEGRATED MULTI-LAYER SWITCH ELEMENT ARCHITECTURE

FIELD OF THE INVENTION

The invention relates generally to the field of computer networking devices. More particularly, the invention relates to an architecture for a highly integrated network element building block.

BACKGROUND OF THE INVENTION

An increasing number of users are requiring increased bandwidth from existing networks due to multimedia applications for accessing the Internet and World Wide Web, for example. Therefore, future networks must be able to support a very high bandwidth and a large number of users. Furthermore, such networks should be able to support multiple traffic types such as data, voice, and video which typically require different bandwidths.

Statistical studies indicate that the network domain, i.e., a group of interconnected local area networks (LANs), as well as the number of individual end-stations connected to each LAN, will grow at ever increasing rates in the future. Thus, more network bandwidth and more efficient use of resources is needed to meet these requirements.

Building networks using Layer 2 elements such as bridges provides fast packet forwarding between LANs; however there is no flexibility in traffic isolation, redundant topologies, and end-to-end policies for queuing and access control. While the latter attributes may be met using Layer 3 elements such as routers, packet forwarding speed is sacrificed in return for the greater intelligence and decision making capabilities provided by routers.

Therefore, it is desirable to provide a cost-effective, high performance network device building block that is capable of performing non-blocking wire-speed multi-layer switching on N ports. Generally, it would be advantageous to provide a network device building block that linearly scales its performance with advances in silicon technology. Therefore, it is desirable to share common resources, centralize common processing, and maximize the utilization of hardware resources. More specifically, it is desirable to utilize a dynamic packet memory management scheme to facilitate sharing of a common packet memory among all input/output ports for packet buffering. Also, it is desirable to centralize packet header processing and to provide efficient access to a centralized database for multiple protocol layer based forwarding decisions. Further, it would be advantageous to provide a central processing unit (CPU) interface that requests forwarding decisions of a switch fabric for CPU originated packets in a first packet forwarding mode and bypasses the switch fabric header matching by transferring the packet directly to one or more specified ports in a second packet forwarding mode.

SUMMARY OF THE INVENTION

A method and apparatus for packet forwarding and filtering is described in the context of an architecture for a highly integrated network element building block. According to one aspect of the present invention, a network device building block includes a network interface with multiple ports for transmitting and receiving packets over a network. The network device building block also includes a packet buffer storage which is coupled to the network interface. The packet buffer storage acts as an elasticity buffer for adapting between incoming and outgoing bandwidth requirements. The network device building block further includes a switch fabric which is coupled to the network interface. The switch fabric provides forwarding decisions for received packets. A given forwarding decision includes a list of ports upon which a particular received packet is to be forwarded. A central processing unit (CPU) interface is also included in the network device building block. The CPU interface is coupled to the switch fabric and is configured to forward packets received from the CPU based upon forwarding decisions provided by the switch fabric.

According to another aspect of the present invention, a switch element includes a switch fabric configured to generate forwarding decisions for received packets. The switch element also includes multiple interfaces for receiving and transmitting packets. Each of the interfaces are coupled in communication with the switch fabric for requesting and receiving forwarding decisions. The interfaces include a network interface, a cascading interface, and a central processing unit (CPU) interface. The network interface further includes multiple external ports for communication with devices on a network. At least two internal links are provided by the cascading interface for interconnecting with one or more other switch elements in a full-mesh topology. The CPU interface allows communication of packets and commands between the switch fabric and a CPU. The switch element further includes a shared memory manager which is coupled to the interfaces for dynamically allocating and deallocating buffers in a shared buffer memory on behalf of the interfaces. The shared memory manager further tracks the status of buffers in the shared buffer memory.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A highly integrated multi-layer switch element architecture is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. While the steps of the present invention are preferably performed by the hardware components described below, alternatively, the steps may be embodied in machine-executable instructions, which may be used to cause a general-purpose or special-purpose processor programmed with the instructions to perform the steps. Further, embodiments of the present invention will be described with respect to a high speed Ethernet switch. However, the method and apparatus described herein are equally applicable to other types of network devices such as bridges, routers, brouters, and other network devices.

AN EXEMPLARY NETWORK ELEMENT

Figure 1:
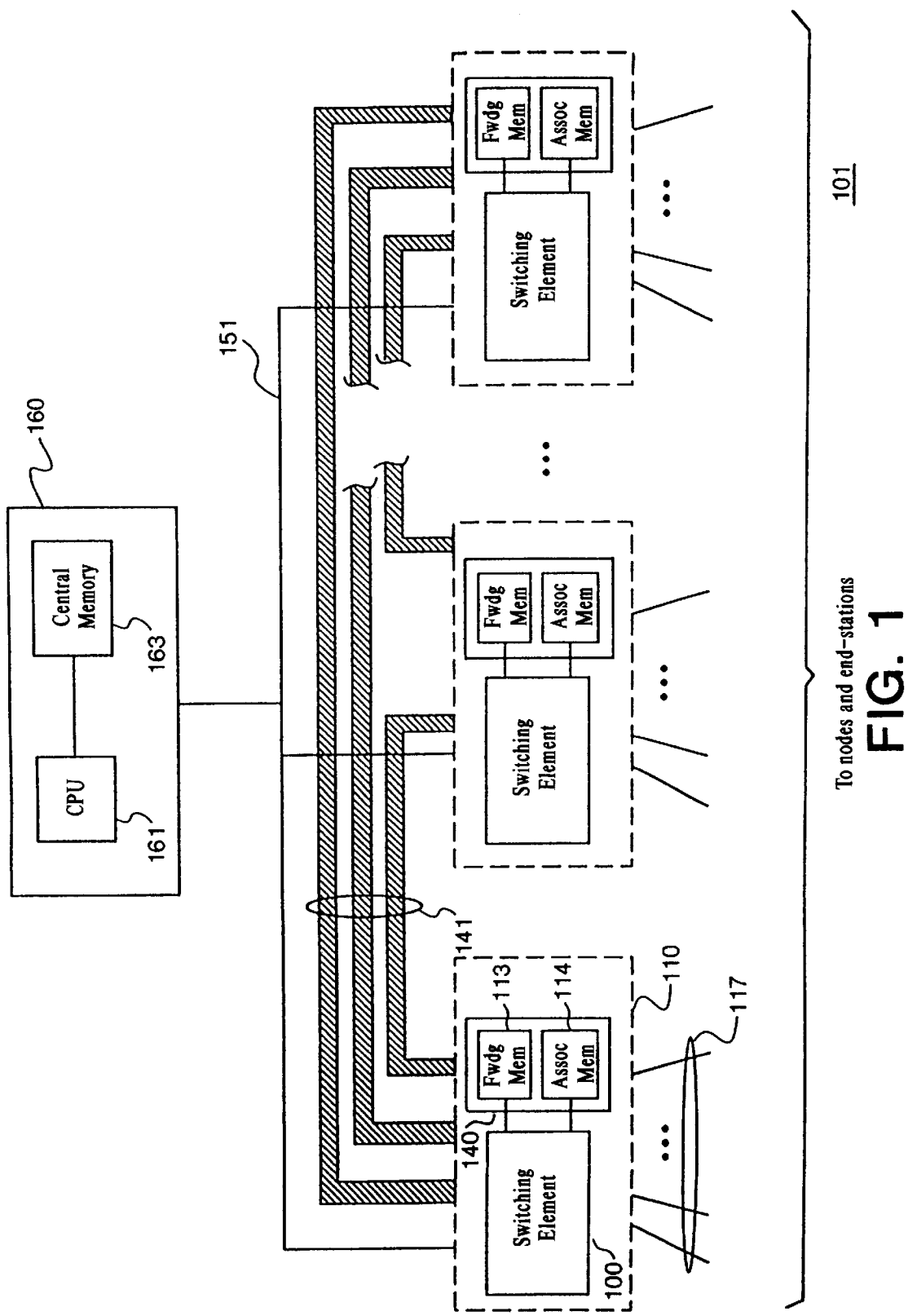
FIG. 1 illustrates a switch according to one embodiment of the present invention.

An overview of one embodiment of a network element that operates in accordance with the teachings of the present invention is illustrated in FIG. 1. The network element is used to interconnect a number of nodes and end-stations in a variety of different ways. In particular, an application of the multi-layer distributed network element (MLDNE) would be to route packets according to predefined routing protocols over a homogenous data link layer such as the IEEE 802.3 standard, also known as Ethernet. Other routing protocols can also be used.

The MLDNE's distributed architecture can be configured to route message traffic in accordance with a number of known or future routing algorithms. In a preferred embodiment, the MLDNE is configured to handle message traffic using the Internet suite of protocols, and more specifically the Transmission Control Protocol (TCP) and the Internet Protocol (IP) over the Ethernet LAN standard and medium access control (MAC) data link layer.

In one embodiment of the MLDNE, a network element is configured to implement packet routing functions in a distributed manner, i.e., different parts of a function are performed by different subsystems in the MLDNE, while the final result of the functions remains transparent to the external nodes and end-stations. As will be appreciated from the discussion below and the diagram in FIG. 1, the MLDNE has a scalable architecture which allows the designer to predictably increase the number of external connections by adding additional subsystems, thereby allowing greater flexibility in defining the MLDNE as a stand alone router.

As illustrated in block diagram form in FIG. 1, the MLDNE 101 contains a number of subsystems 110 that are fully meshed and interconnected using a number of internal links 141 to create a larger switch. At least one internal link couples any two subsystems. Each subsystem 110 includes a switch element 100 coupled to a forwarding and filtering database 140, also referred to as a forwarding database. The forwarding and filtering database may include a forwarding memory 113 and an associated memory 114. The forwarding memory (or database) 113 stores an address table used for matching with the headers of received packets. The associated memory (or database) stores data associated with each entry in the forwarding memory that is used to identify forwarding attributes for forwarding the packets through the MLDNE. A number of external ports (not shown) having input and output capability interface the external connections 117. In one embodiment, each subsystem supports multiple Gigabit Ethernet ports, Fast Ethernet ports and Ethernet ports. Internal ports (not shown) also having input and output capability in each subsystem couple the internal links 141. Using the internal links, the MLDNE can connect multiple switching elements together to form a multigigabit switch.

The MLDNE 101 further includes a central processing system (CPS) 160 that is coupled to the individual subsystem 110 through a communication bus 151 such as the peripheral components interconnect (PCI). The CPS 160 includes a central processing unit (CPU) 161 coupled to a central memory 163. Central memory 163 includes a copy of the entries contained in the individual forwarding memories 113 of the various subsystems. The CPS has a direct control and communication interface to each subsystem 110 and provides some centralized communication and control between switch elements.

AN EXEMPLARY SWITCH ELEMENT

Figure 2:
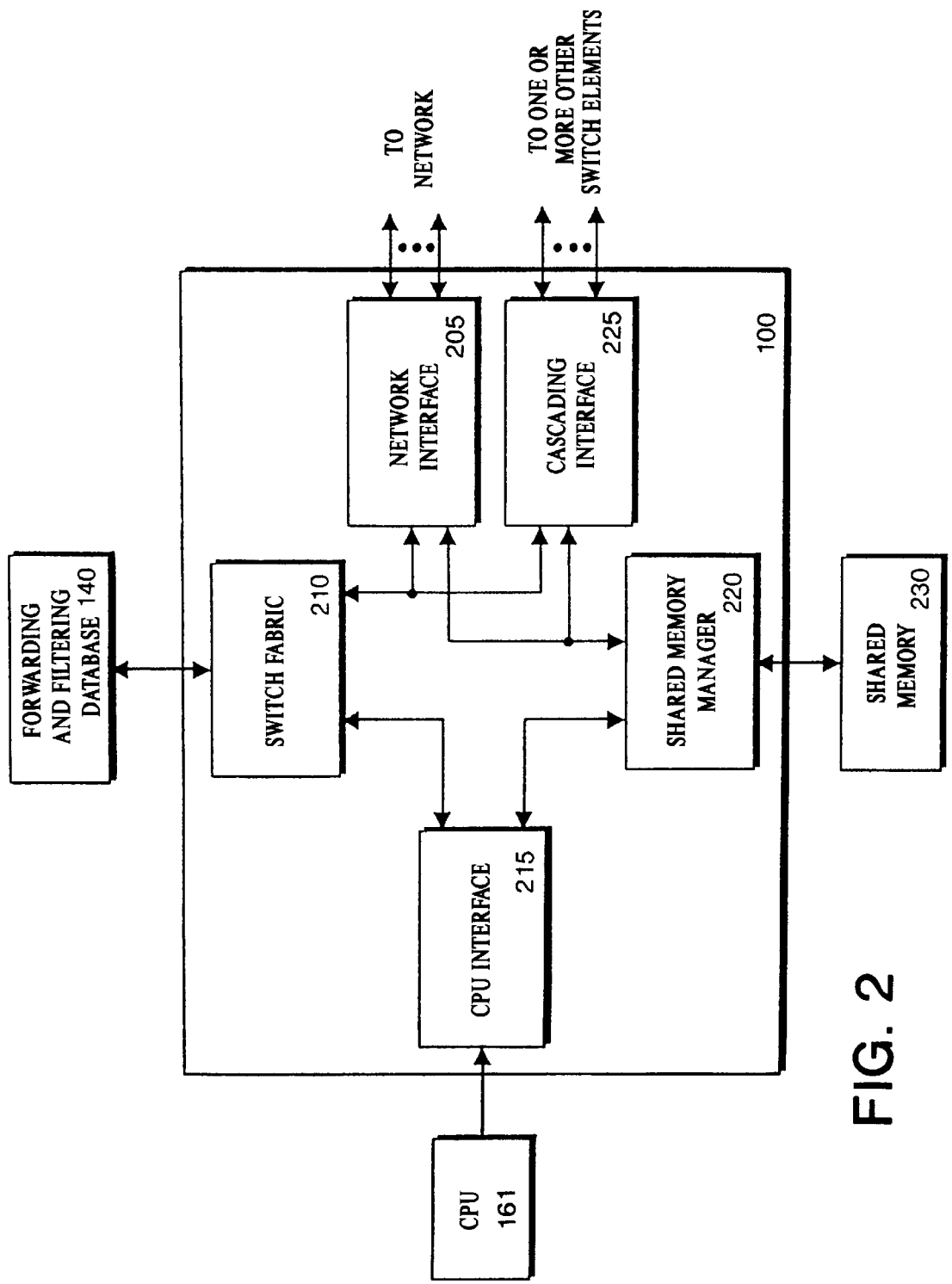
FIG. 2 is a simplified block diagram of an exemplary switch element that may be utilized in the switch of FIG. 1.
Figure 3:
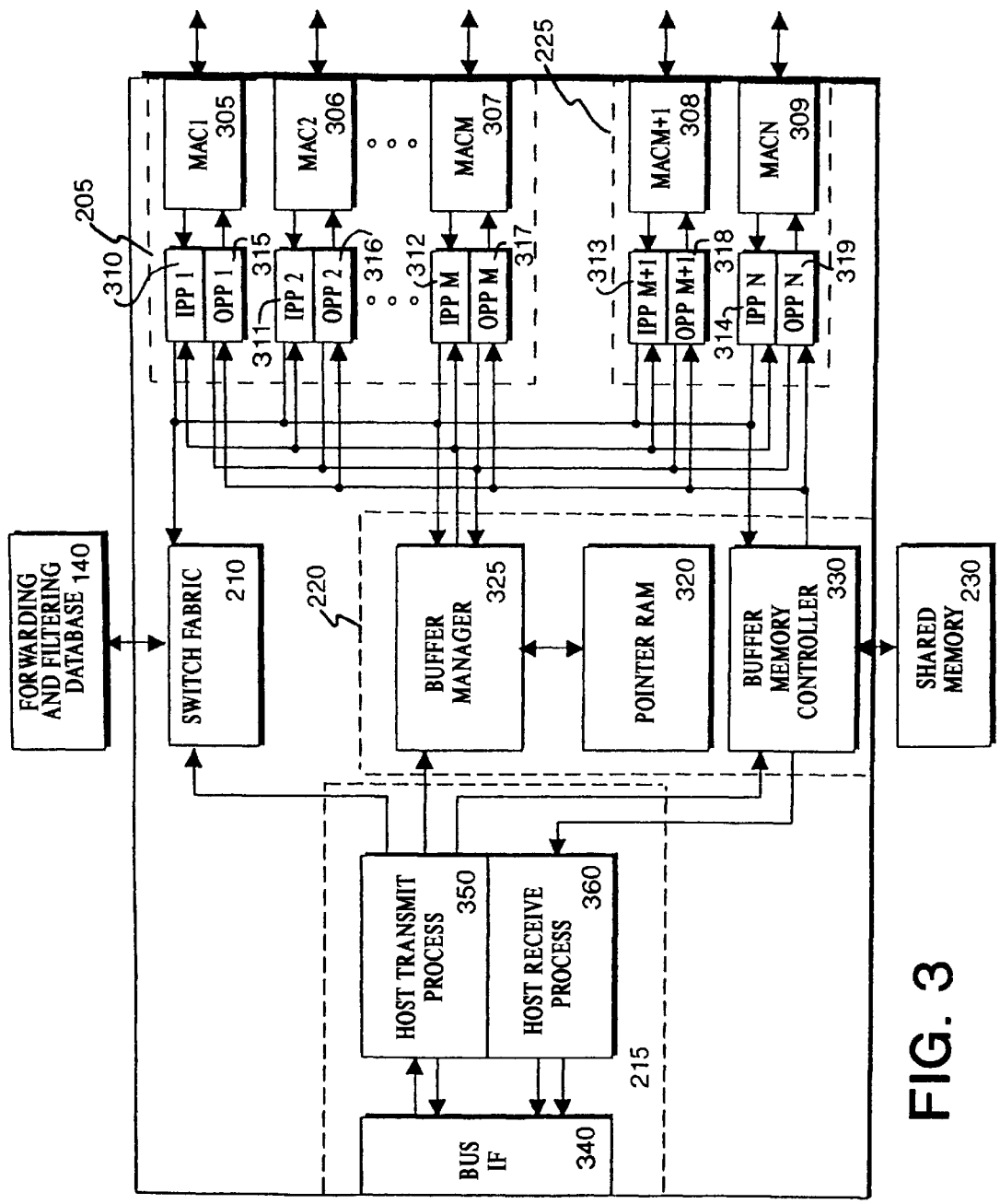
FIG. 3 is a more detailed block diagram of the switch element of FIG. 2.

FIG. 2 is a simplified block diagram illustrating an exemplary architecture of the switch element of FIG. 1. The switch element 100 depicted includes a central processing unit (CPU) interface 215, a switch fabric block 210, a network interface 205, a cascading interface 225, and a shared memory manager 220.

Ethernet packets may enter or leave the network switch element 100 through any one of the three interfaces 205, 215, or 225. In brief, the network interface 205 operates in accordance with a corresponding Ethernet protocol to receive Ethernet packets from a network (not shown) and to transmit Ethernet packets onto the network via one or more external ports (not shown). An optional cascading interface 225 may include one or more internal links (not shown) for interconnecting switching elements to create larger switches. For example, each switch element 100 may be connected together with other switch elements in a full mesh topology to form a multi-layer switch as described above. Alternatively, a switch may comprise a single switch element 100 with or without the cascading interface 225.

The CPU 161 may transmit commands or packets to the network switch element 100 via the CPU interface 215. In this manner, one or more software processes running on the CPU 161 may manage entries in an external forwarding and filtering database 140, such as adding new entries and invalidating unwanted entries. In alternative embodiments, however, the CPU 161 may be provided with direct access to the forwarding and filtering database 140. In any event, for purposes of packet forwarding, the CPU port of the CPU interface 215 resembles a generic input port into the switch element 100 and may be treated as if it were simply another external network interface port. However, since access to the CPU port occurs over a bus such as a peripheral components interconnect (PCI) bus, the CPU port does not need any media access control (MAC) functionality.

Returning to the network interface 205, the two main tasks of input packet processing and output packet processing will now briefly be described. Input packet processing may be performed by one or more input ports of the network interface 205. Input packet processing includes the following: (1) receiving and verifying incoming Ethernet packets, (2) modifying packet headers when appropriate, (3) requesting buffer pointers from the shared memory manager 220 for storage of incoming packets, (4) requesting forwarding decisions from the switch fabric block 210, (5) transferring the incoming packet data to the shared memory manager 220 for temporary storage in an external shared memory 230, and (5) upon receipt of a forwarding decision, forwarding the buffer pointer(s) to the output port(s) indicated by the forwarding decision. Output packet processing may be performed by one or more output ports of the network interface 205. Output processing includes requesting packet data from the shared memory manager 220, transmitting packets onto the network, and requesting deallocation of buffer(s) after packets have been transmitted.

The network interface 205, the CPU interface 215, and the cascading interface 225 are coupled to the shared memory manager 220 and the switch fabric block 210. Preferably, critical functions such as packet forwarding and packet buffering are centralized as shown in FIG. 2. The shared memory manager 220 provides an efficient centralized interface to the external shared memory 230 for buffering of incoming packets. The switch fabric block 210 includes a search engine and learning logic for searching and maintaining the forwarding and filtering database 140 with the assistance of the CPU 161.

The centralized switch fabric block 210 includes a search engine that provides access to the forwarding and filtering database 140 on behalf of the interfaces 205, 215, and 225. Packet header matching, Layer 2 based learning, Layer 2 and Layer 3 packet forwarding, filtering, and aging are exemplary functions that may be performed by the switch fabric block 210. Each input port is coupled with the switch fabric block 210 to receive forwarding decisions for received packets. The forwarding decision indicates the outbound port(s) (e.g., external network port or internal cascading port) upon which the corresponding packet should be transmitted. Additional information may also be included in the forwarding decision to support hardware routing such as a new MAC destination address (DA) for MAC DA replacement. Further, a priority indication may also be included in the forwarding decision to facilitate prioritization of packet traffic through the switch element 100.

In the present embodiment, Ethernet packets are centrally buffered and managed by the shared memory manager 220. The shared memory manager 220 interfaces with every input port and output port and performs dynamic memory allocation and deallocation on their behalf, respectively. During input packet processing, one or more buffers are allocated in the external shared memory 230 and an incoming packet is stored by the shared memory manager 220 responsive to commands received from the network interface 205, for example. Subsequently, during output packet processing, the shared memory manager 220 retrieves the packet from the external shared memory 230 and deallocates buffers that are no longer in use. To assure no buffers are released until all output ports have completed transmission of the data stored therein, the shared memory manager 220 preferably also tracks buffer ownership.

Having described the architecture of the switch element 100 at a high level, a more detailed view of the individual components will now be described with reference to FIG.

NETWORK AND CASCADING INTERFACES

The switch element of the present invention provides wire speed routing and forwarding of Ethernet, Fast Ethernet, and Gigabit Ethernet packets among the three interfaces 215, 205, and 225. According to the present embodiment, each port of the network interface 205 and the cascading interface 225 includes an input packet process (IPP), an output packet process (OPP), and a media access controller (MAC).

The IPPs are coupled in communication with the switch fabric 210, the shared memory manager 220, and the OPPs. The IPPs request forwarding decisions from the switch fabric 210 for received packets and temporarily store the packet data in the shared memory 230 until a forwarding decision is returned. Upon receipt of a forwarding decision, the IPPs forward the corresponding packet to the appropriate OPPs, if any.

According to one embodiment, received packet headers are modified by the IPPs as disclosed in U.S. patent application Ser. No. 08/885,000 entitled "Mechanism for Packet Field Replacement in a Multi-Layered Switched Network Element" filed on Jun. 30, 1997, which is incorporated herein by reference.

The OPPs are coupled in communication with the shared memory manager 220. When a packet is ready for transmission, the OPPs retrieve the packet data from the shared memory 230 via the shared memory manager 220 and transmit the packet data onto the attached network.

According to one embodiment, dynamic output queuing in the OPPs is as disclosed in U.S. patent application Ser. No. 08/885,232 entitled "Method and Apparatus for Dynamic Queue Sizing" filed on Jun. 30, 1997, which is incorporated herein by reference.

According to another embodiment, packet routing and packet field replacement are as disclosed in U.S. patent application Ser. No. 08/885,257 entitled "Mechanism for Packet Field Replacement in a distributed Multi-Layer Network Element" filed on Jun. 30, 1997, which is incorporated herein by reference.

SWITCH FABRIC

The switch fabric 210 provides centralized access to the forwarding and filtering database 140 on behalf of the input ports. Highly pipelined logic within the switch fabric 210 allows it to receive and process packet headers from several input ports at once. Advantageously, the centralization and pipelining reduce hardware implementation overhead. For example, an N stage packet header processing pipeline allows N packet headers to be processed from various input ports in a single block rather than having to provide N individual packet header processing units.

According to one embodiment, the switch fabric 210 is implemented as disclosed in U.S. patent application Ser. No. 08/885,116 entitled "Search Engine Architecture for a High Performance Multi-Layer Switch Element" filed on Jun. 30, 1997, and U.S. patent application Ser. No. 08/885,047 entitled "Hardware-Assisted Central Processing Unit Access to a Forwarding Database" filled on Jun. 30, 1997, the contents of which are incorporated herein by reference.

CPU INTERFACE

The CPU interface 215 of the present embodiment, includes a single CPU port comprising a bus interface (BIF) 340 coupled to a host transmit process (HTP) 350 and a host receive process (HRP) 360. The BIF 340 implements a bus interface protocol for communicating data between the CPU 161 and the switch element 100. In this respect, it has similar responsibilities as the MACs in the network interface ports. In one embodiment, the BIF 340 includes a PCI protocol block for supporting PCI direct memory accesses (DMAs) to and from the CPU memory.

Architecturally the CPU port is designed to mirror the network interface ports and cascading interface ports. The BIF 340 corresponds functionally with a network interface port MAC. For example, both the BIF 340 and the MACs are responsible for dealing with a particular protocol (e.g., PCI and Ethernet, respectively) for communication over a physical medium with devices external to the switch element 100. Similarly, the HTP 350 corresponds to an IPP of a network interface port. Both the HTP 350 and the IPP are responsible for buffering incoming packets, requesting forwarding decisions from the switch fabric 210, and transferring incoming packets to appropriate output port(s). Finally, the HRP 360 corresponds to an OPP of a network interface port. Both the HRP 360 and the OPP are responsible for retrieving outbound packets from the shared memory 230, transmitting outbound packets, and notifying the shared memory manager 220 when packet buffer pointers may be released. This novel CPU interface architecture allows the CPU port to be treated by the other switch element components as if it were simply another network interface port.

Another feature of the CPU interface 215 is the availability of two forwarding modes for CPU originated packets. In one embodiment, the CPU interface 215 is configured to operate in one of two forwarding modes with respect to a given packet based upon per packet control information provided by the CPU. In the first mode, the switch mode, the CPU interface 215 requests forwarding decisions from the switch fabric 210 and in the second mode, the directed mode, switch fabric header matching is bypassed, thereby allowing the packet to be directly transferred to one or more specified ports.

Since the switch fabric 210 and the shared memory manager 220 generally interact with the CPU interface 215 as if it were another network interface, the switch mode for CPU originated packets parallels the packet forwarding that takes place at the network interface 205 and cascading interface 225. As will be appreciated, the innovative design and treatment of the CPU interface 215 provide for an efficient implementation of the novel switch mode for CPU originated packets.

Referring now to the directed mode, the CPU interface 215 forwards CPU originated packets based on control information that accompanies the CPU originated packets. The control information may contain information about the packet for facilitating packet processing by the switch element 100. For example, in one embodiment, a directed mode flag may be provided within the control information to indicate that the packet is to be transferred to one or more specified output ports rather than forwarded with reference to a forwarding decision provided by the switch fabric 210. In this case, the typical packet header matching and forwarding database search will be bypassed, and the packet will be transferred to the specified output port(s). It is appreciated that other flags and control information may also be incorporated into the control information.

SHARED MEMORY MANAGER

According to the present embodiment, the shared memory manager 220 includes a buffered architecture that utilizes a shared pool of packet memory and a dynamic buffer allocation scheme. Prior input port buffering and output buffering packet buffering schemes typically have a static portion of memory associated with each port, resulting in inefficient memory allocation and buffering that is not related to the actual amount of traffic through a given port. In contrast, the memory management provided by the present invention is designed to achieve efficient allocation of per port buffering that is proportional to the amount of traffic through a given port.

The shared memory manager 220 provides an efficient centralized interface to the shared memory 230 for buffering of incoming packets. The shared memory 230 is a pool of buffers that are used for temporary storage of packet data en route from an inbound interface (e.g., IPP 310–314 or HTP 350) to one or more outbound interfaces (e.g., OPP 315–319 or HTP 360). Essentially, the shared memory serves as an elasticity buffer for adapting between the incoming and outgoing bandwidth requirements.

According to this embodiment, the shared memory manager 220 includes a buffer manager 325. A level of indirection is provided by the buffer manager 325 which is exploited by the input and output ports by queuing packet pointers instead of the packet data itself. As such, the buffering provided by the present invention does not fit into the prior buffering categories such as input packet buffering or output packet buffering. Rather, the buffering described herein is best described as shared memory buffering with output queuing. Advantageously, since pointers are queued at the ports, the act of switching, according to the present embodiment, is reduced to transferring a packet pointer between an input port to a specific queue of one or more output ports.

Each buffer in the shared memory 230 may be owned by one or more different ports at different points in time. For example, copies of a multicast packet's buffer pointer(s) may reside in several output port queues. In the embodiment depicted, the shared memory manager 220 also includes a pointer random access memory (PRAM) 320 coupled to the buffer manager 325. The pointer RAM 320 is an on-chip pointer table that stores usage counts for pages (buffers) of the shared memory 230. In this manner, the number of buffer owners at a given time is known by the buffer manager 325. Thus allowing the buffer manager 325 to perform dynamic deallocation of buffers upon release by the last output port.

According to one embodiment, the buffer manager 325 is implemented as disclosed in U.S. patent application Ser. No. 08/885,118 entitled Shared Memory Management in a Switched Network Element filed on Jun. 30, 1997, the contents of which is incorporated herein by reference.

Buffer memory controller 330 provides a centralized interface to the input and output ports for storing and retrieving packet data, respectively, to the shared memory 230. According to one embodiment, the buffer memory controller 330 is implemented as disclosed in U.S. patent application Ser. No. 08/885,764 entitled "Method and Apparatus For Arbitrating Access to a Shared Memory by Network Ports Operating at Different Data Rates" filed on Jun. 30, 1997, and U.S. patent application Ser. No. 08/885,159 entitled "Method and Apparatus In a Packet Routing Switch for Controlling Access at Different Data Rates to a Shared Memory", filed on Jun. 30, 1997, the contents of which are incorporated herein by reference.

Thus, a buffered architecture has been described which provides temporary storage of received packets in a shared pool of packet memory and provides for efficient allocation of per port buffering that is proportional to the amount of traffic through a given port In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A network device building block for a switch comprising:

a network interface including a plurality of ports for transmitting and receiving packets over a network;

packet buffer storage coupled to each port of the network interface acting as an elasticity buffer for adapting between incoming and outgoing bandwidth requirements;

a switch fabric coupled to the network interface for providing a forwarding decision corresponding to a received packet, the forwarding decision including a list of ports upon which the received packet is to be forwarded; and a central processing unit (CPU) interface coupled to the switch fabric, the CPU interface configured to (1) to receive commands issued to the switch fabric by an external CPU and (2) receive packets from the CPU to be forwarded through the network interface.

2. The network device building block of claim 1, further comprising a cascading interface for coupling the network device building block to one or more other network device building blocks to form a larger switching device.

3. A network device building block for a switch comprising:
   a switch fabric configured to generate forwarding decisions for received packets;
   a plurality of interfaces for receiving and transmitting packets, the plurality of interfaces coupled to the switch fabric for requesting and receiving the forwarding decisions, the plurality of interfaces including a network interface providing a plurality of external ports for communication with devices on a network,
   a cascading interface providing at least two internal links for interconnecting with one or more other switch elements in a full-mesh topology, and
   a central processing unit (CPU) interface for communication of packets and commands between the switch fabric and an external CPU, the CPU interface configured to (1) to receive commands issued to the switch fabric by the external CPU and (2) receive packets from the CPU to be forwarded through the network interface; and
   a shared memory manager coupled to the plurality of interfaces for dynamically allocating and deallocating buffers in a shared buffer memory on behalf of the plurality of interfaces and tracking the status of buffers in the shared buffer memory.

4. A method of forwarding a packet onto a network of devices, the method comprising the steps of:
   a central processing unit (CPU) of the switch generating a packet for transmission onto the network of devices;
   a switch element of the switch receiving the packet on a CPU interface of the switch element, the CPU interface configured to issue commands to the switch fabric responsive to the CPU of the switch and to forward packets received from the CPU of the switch; and
   if the packet is associated with a first forwarding mode, then
      the CPU interface requesting a forwarding decision for the packet from a switch fabric of the switch element,
      the CPU interface receiving the forwarding decision from the switch fabric,
      the CPU interface forwarding the packet to one or more ports of the switch element indicated by the forwarding decision, and
      the one or more ports transmitting the packet onto the network of devices.

5. The method of claim 4, wherein the packet includes control information, the method further comprising the steps of:
   based upon the control information, the CPU interface determining that the packet is associated with a second forwarding mode; and
   the CPU interface forwarding the packet to one or more ports of the switch element indicated by the control information.

6. A network device building block for a switch comprising:
   a plurality of ports for receiving and transmitting packets over a network segment;
   a shared memory manager coupled to each of the plurality of ports, the shared memory manager configured to dynamically allocate buffers from a shared memory for temporary storage of incoming packets, the shared memory manager further configured to release buffers associated with a particular packet when all ports to which the packet was forwarded have completed transmission of the packet;
   a switch fabric coupled to each of the plurality of ports to provide a centralized interface to a forwarding and filtering database associated with the switch fabric; and
   a cascading interface providing at least two internal ports for interconnecting the network device building block with one or more other network device building blocks to form a larger network device; and
   a central processing unit (CPU) interface coupled to the switch fabric, the CPU interface configured to (a) issue commands to the switch fabric responsive to an external CPU of the switch, (b) forward packets received from the external CPU based upon forwarding decisions provided by the switch fabric in a first forwarding mode, and (c) forward packets with associated control information received from the external CPU to one or more of the plurality of ports as indicated in the control information in a second forwarding mode.

7. A method of packet forwarding, the method comprising the steps of:
   a central processing unit of a network device generating a packet for transmission including providing control information in the packet to select between a first forwarding mode and a second forwarding mode;
   a switch element of the network device receiving the packet on a central processing unit (CPU) interface of the switching element;
   if the control information indicates the packet is to be forwarded according to the
      first forwarding mode, then
      the CPU interface obtaining a forwarding decision for the packet, and
      the CPU interface forwarding the packet to one or more ports of the switch element indicated by the forwarding decision; and
   if the control information indicates the packet is to be forwarded according to the second forwarding mode, then the CPU interface forwarding the packet to one or more ports of the switch element indicated by the control information.

8. A network device building block for a switch comprising:
   a plurality of external ports for receiving and transmitting packets;
   a switch fabric coupled to the plurality of external ports and generating packet forwarding decisions on behalf of the plurality of external ports;
   a shared memory manager coupled to the plurality of external ports and dynamically allocating and deallocating buffers in a shared buffer memory on behalf of the plurality of external ports and tracking the status of buffers in the shared buffer memory; and
   central processing unit (CPU) interface coupled to the switch fabric and the shared memory manager to forward packets from an external CPU based upon forwarding decisions provided by the switch fabric in a first forwarding mode, the CPU interface capable of interfacing with the switch fabric and the shared memory manager as if it were one of the plurality of external ports by architecturally mirroring functional aspects of the plurality of external ports, and to forward packets received from the external CPU to ports indicated by control information according to an indication by the control information that the packet is to be forwarded according to a second forwarding mode.

9. A switch comprising:

one or more network device building blocks, each of the one or more network device building blocks having (a) a plurality of ports to receive and transmit packets over a network segment, (b) a shared memory manager coupled to each of the plurality of ports, the shared memory manager configured to dynamically allocate buffers from a shared memory for temporary storage of incoming packets, the shared memory manager further configured to release buffers associated with a particular packet when all ports to which the packet was forwarded have completed transmission of the packet, (c) a switch fabric coupled to each of the plurality of ports to provide a centralized interface to a forwarding and filtering database associated with the switch fabric, and (d) a CPU interface to facilitate communication of packets and commands between switch fabric and the CPU; and a central processing system (CPS) coupled to each of the one or more network device building blocks, the CPS having central memory and a central processing unit (CPU), the CPU being configured to (1) issue commands to each of the one or more network device building blocks, and (2) send packets to each of the one or more network device building blocks through the CPU interface for forwarding to one or more of the plurality of ports based on a decision provided by the switch fabric in a first forwarding mode.

10. The switch of claim 9, wherein the switch includes at least two network device building blocks, each having a plurality of cascading interface ports to interconnect the network device building blocks, and each of the network device building blocks are interconnected by the plurality of cascading interface ports to form a full-mesh topology.

11. The switch of claim 9, wherein, in a seconding forwarding mode, the CPU may send packets and associated control information to each of the one or more network device building blocks though the CPU interface, the CPU interface forwarding the packets to one or more of the plurality of ports as indicated by the control information.

12. The switch of claim 10, wherein, in a seconding forwarding mode, the CPU may send packets and associated control information to each of the one or more network device building blocks though the CPU interface, the CPU interface forwarding the packets to one or more of the plurality of ports as indicated by the control information.

* * * * *